US011689608B1

(12) United States Patent
Liu et al.

(10) Patent No.: US 11,689,608 B1
(45) Date of Patent: Jun. 27, 2023

(54) METHOD, ELECTRONIC DEVICE, AND COMPUTER PROGRAM PRODUCT FOR DATA SHARING

(71) Applicant: Dell Products L.P., Round Rock, TX (US)

(72) Inventors: Jinpeng Liu, Shanghai (CN); Jiacheng Ni, Shanghai (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/828,185

(22) Filed: May 31, 2022

(30) Foreign Application Priority Data

Apr. 22, 2022 (CN) .......................... 202210432219.3

(51) Int. Cl.
*H04L 67/10* (2022.01)
*G06F 9/54* (2006.01)

(52) U.S. Cl.
CPC ................ *H04L 67/10* (2013.01); *G06F 9/54* (2013.01)

(58) Field of Classification Search
CPC ........... H04L 67/10; G06F 9/54; G06N 20/00; G06N 3/08
See application file for complete search history.

(56) References Cited

U.S. PATENT DOCUMENTS

| | | | |
|---|---|---|---|
| 10,067,900 B2* | 9/2018 | Watkins | G06F 13/4068 |
| 2013/0103759 A1* | 4/2013 | Blom | H04L 63/04 709/204 |
| 2018/0024865 A1* | 1/2018 | Saga | G06F 9/52 709/226 |
| 2019/0187963 A1* | 6/2019 | Bokhari | G06F 30/30 |
| 2019/0228308 A1* | 7/2019 | Zhou | G06N 20/00 |
| 2021/0216495 A1* | 7/2021 | Ahn | G06F 9/544 |
| 2021/0303344 A1 | 9/2021 | Li et al. | |

OTHER PUBLICATIONS

Intel, "PlaidML," https://www.intel.com/content/www/us/en/artificial-intelligence/plaidml.html, Accessed Dec. 30, 2021, 4 pages.

(Continued)

*Primary Examiner* — Cheikh T Ndiaye
(74) *Attorney, Agent, or Firm* — Ryan, Mason & Lewis, LLP (57) ABSTRACT

Embodiments of the present disclosure provide a method, a device, and a computer program product for data sharing. The method includes acquiring first parameter information corresponding to a source process and second parameter information corresponding to a target process, and selecting a desired data sharing method from methods for sharing data between the source process and the target process based on the first parameter information and the second parameter information. The method further includes realizing data sharing between the source process and the target process based on the desired data sharing method. Through this solution, the data sharing efficiency between processes can be improved.

20 Claims, 5 Drawing Sheets

(56) References Cited

OTHER PUBLICATIONS

M. Memon, "Project Radium: Finally, Modern AI Infrastructure with Multi-Architecture Support," https://octo.vmware.com/introducing-project-radium/, Oct. 5, 2021, 7 pages.

U.S. Appl. No. 17/129,222 filed in the name of Jinpeng Liu et al. on Dec. 21, 2020, and entitled "Method, Electronic Device, and Computer Program Product for Deploying Machine Learning Model.".

U.S. Appl. No. 17/217,203 filed in the name of Jinpeng Liu et al. on Mar. 30, 2021, and entitled "Model Parameter Sharing Between Inference Application Instances in Processing Unit of Information Processing System.".

* cited by examiner

METHOD, ELECTRONIC DEVICE, AND COMPUTER PROGRAM PRODUCT FOR DATA SHARING

RELATED APPLICATION(S)

The present application claims priority to Chinese Patent Application No. 202210432219.3, filed Apr. 22, 2022, and entitled "Method, Electronic Device, and Computer Program Product for Data Sharing," which is incorporated by reference herein in its entirety.

FIELD

Embodiments of the present disclosure relate to the field of computer technology, and more particularly, to a method, an electronic device, and a computer program product for data sharing.

BACKGROUND

With the rapid development of big data, techniques for improving computing speed, improving computing accuracy, and meeting the needs of real-time computing have increasingly been a focus of attention. For example, parallel computing is an important solution for quickly solving large and complex computing problems. Generally, a computing process involves computing resource scheduling and data sharing. Therefore, efficient data sharing plays a key role in distributed computing.

In addition, deep learning, as a branch in the field of machine learning, has solved many complex pattern recognition problems, making great progress in artificial intelligence-related technologies. For example, at present, deep learning with distributed computing has achieved many results in search technology, data mining, machine learning, natural language processing, multimedia learning, speech, recommendation and personalization technology, and other related fields.

SUMMARY

Embodiments of the present disclosure provide a solution for data sharing.

In a first aspect of the present disclosure, a method for data sharing is provided. The method includes: acquiring first parameter information corresponding to a source process and second parameter information corresponding to a target process; selecting a desired data sharing method from methods for sharing data between the source process and the target process based on the first parameter information and the second parameter information; and realizing data sharing between the source process and the target process based on the desired data sharing method.

In a second aspect of the present disclosure, an electronic device is provided. The electronic device includes at least one processor; and at least one memory storing computer-executable instructions, the at least one memory and the computer-executable instructions being configured to cause, together with the at least one processor, the electronic device to perform actions. The actions include: acquiring first parameter information corresponding to a source process and second parameter information corresponding to a target process; selecting a desired data sharing method from methods for sharing data between the source process and the target process based on the first parameter information and the second parameter information; and realizing data sharing between the source process and the target process based on the desired data sharing method.

In a third aspect of the present disclosure, a computer program product is provided. The computer program product is tangibly stored in a non-transitory computer-readable medium and includes computer-executable instructions, wherein when executed by a device, the computer-executable instructions cause the device to perform: acquiring first parameter information corresponding to a source process and second parameter information corresponding to a target process; selecting a desired data sharing method from methods for sharing data between the source process and the target process based on the first parameter information and the second parameter information; and realizing data sharing between the source process and the target process based on the desired data sharing method.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

DETAILED DESCRIPTION

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As used herein, the term "machine learning" refers to processing involving high-performance computing, machine learning, and artificial intelligence algorithms. Herein, the term "machine learning model" may also be referred to as a "learning model," "learning network," "network model," or "model." A "neural network" or "neural network model" is a deep learning model. In general, a machine learning model is capable of receiving input data, performing predictions based on the input data, and outputting prediction results.

Generally, a machine learning model may include multiple processing layers, each processing layer having multiple processing units. The processing units are sometimes also referred to as convolution kernels. In a convolution layer of a convolution neural network, also commonly referred to as a CNN, processing units are referred to as convolution kernels or convolution filters. Processing units in each processing layer perform corresponding changes on inputs of that processing layer based on corresponding parameters. An output of the processing layer is provided as an input to the next processing layer. An input to the first processing layer of the machine learning model is a model input to the machine learning model, and an output of the last processing layer is a model output of the machine learning model. Inputs to the intermediate processing layers are sometimes also referred to as features extracted by the machine learning model. Values of all parameters of the processing units of the machine learning model form a set of parameter values of the machine learning model.

Machine learning can mainly be divided into three stages, namely, a training stage, a testing stage, and an application stage (also referred to as an inference stage). During the training stage, a given machine learning model can be trained using a large number of training samples and iterated continuously until the machine learning model can obtain, from the training samples, consistent inferences which are similar to the inferences that human intelligence can make. Through training, the machine learning model may be considered as being capable of learning mapping or an association relationship between inputs and outputs from training data. After training, a set of parameter values of the machine learning model is determined. In the testing stage, the trained machine learning model may be tested by using test samples to determine the performance of the machine learning model. In the application stage, the machine learning model can be used to process, based on the set of parameter values obtained from the training, actual input data to provide corresponding outputs.

With the development of big data, the amount of data that needs to be processed is increasing, and the effective use of computing resources is becoming increasingly more important, resulting in increasingly more complex computing environments. How to achieve more efficient data sharing in complex environments is still an urgent technical problem to be solved. Corresponding solutions have been proposed for different data sharing scenarios that may exist; however, the corresponding solutions are only suitable for specific resource configuration scenarios. For example, a certain data sharing method is only suitable for specific hardware computing device configurations, so that the lack of flexibility in data sharing in complex computing environments results in limited data sharing in the complex computing environments.

In order to solve at least the above problems, an improved solution for data sharing is provided in example embodiments of the present disclosure. In this solution, after acquiring parameter information corresponding to a source process and parameter information corresponding to a target process, a desired data sharing method is selected from methods for sharing data between the source process and the target process, and data sharing is realized based on the desired data sharing method.

Through this solution, regardless of whether the source process and the target process are located in the same processing device or different processing devices in the same network, and regardless of whether the source process and the target process are executed by the same type of processing device, a desired data sharing method corresponding to the source process and the target process can be found, and therefore, an efficient data sharing method suitable for the configuration of computing resources such as hardware and network can be automatically realized, so as to improve the computing speed of deep learning, for example.

Figure 1:
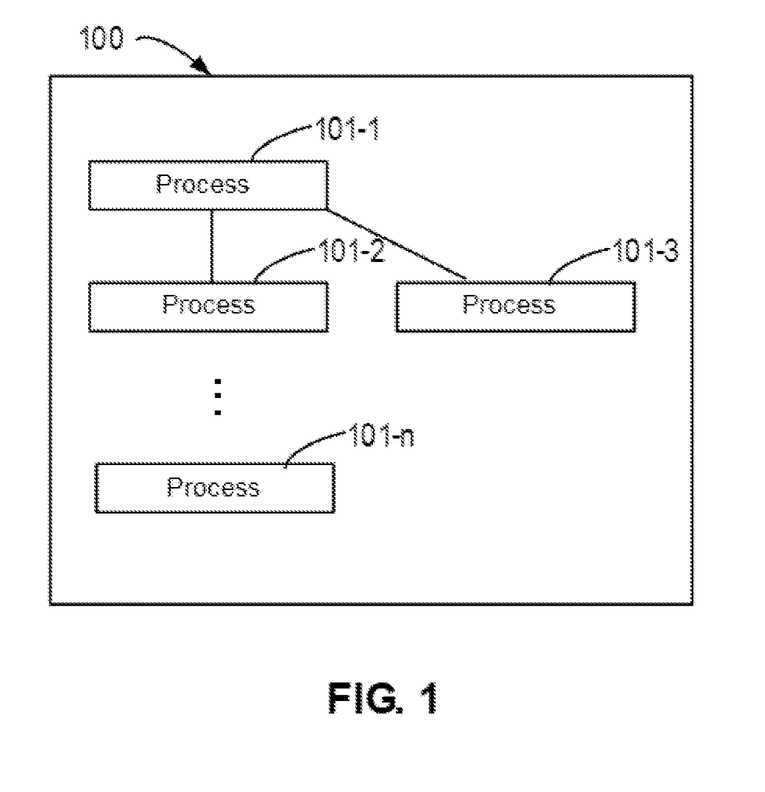
FIG. 1 is a schematic diagram of an example environment in which embodiments of the present disclosure can be implemented.

FIG. 1 is a schematic diagram of an example computing environment 100 in which embodiments of the present disclosure can be implemented, the computing environment 100 being associated with configuration of computing resources. For example, the configuration of the computing resources includes scheduling of computing devices (which may also be referred to as "processing devices") and data scheduling between the computing devices. The computing device herein may include, for example, a graphics processing unit (GPU), a Data Processing Unit (DPU), an Image Processing Unit (IPU), a task processing unit (TPU), and other processing devices. The computing devices herein may be, for example, processing devices produced by the same manufacturer, or may be processing devices produced by different manufacturers.

In computing environment 100 of FIG. 1, there are two or more processes 101 (e.g., processes 101-1 to 101-$n$, where n is any positive integer, collectively referred to as or simply referred to as processes 101), and data can be shared between the two or more processes 101. For example, in a deep learning application, distributed computing of a learning process that involves data sharing between the two processes can be implemented by a plurality of processes in computing environment 100. It should be understood that computing environment 100 and process 101 referred to herein may be applicable to any application such as other types of machine learning where data sharing exists.

Example computing environment 100 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, and the like. The server computer, also referred to herein as a server, may be a cloud server, also known as a cloud computing server or a cloud host, which is a host product in a cloud computing service system. Such a server may be configured for solving the defects of considerable management difficulty and low business extensibility in a conventional physical host, and may include a virtual private server (VPS). The server may also be a server of a distributed system, or a server combined with a block chain.

Example embodiments for data sharing in the present disclosure will be discussed in more detail below with reference to the accompanying drawings.

Figure 2:
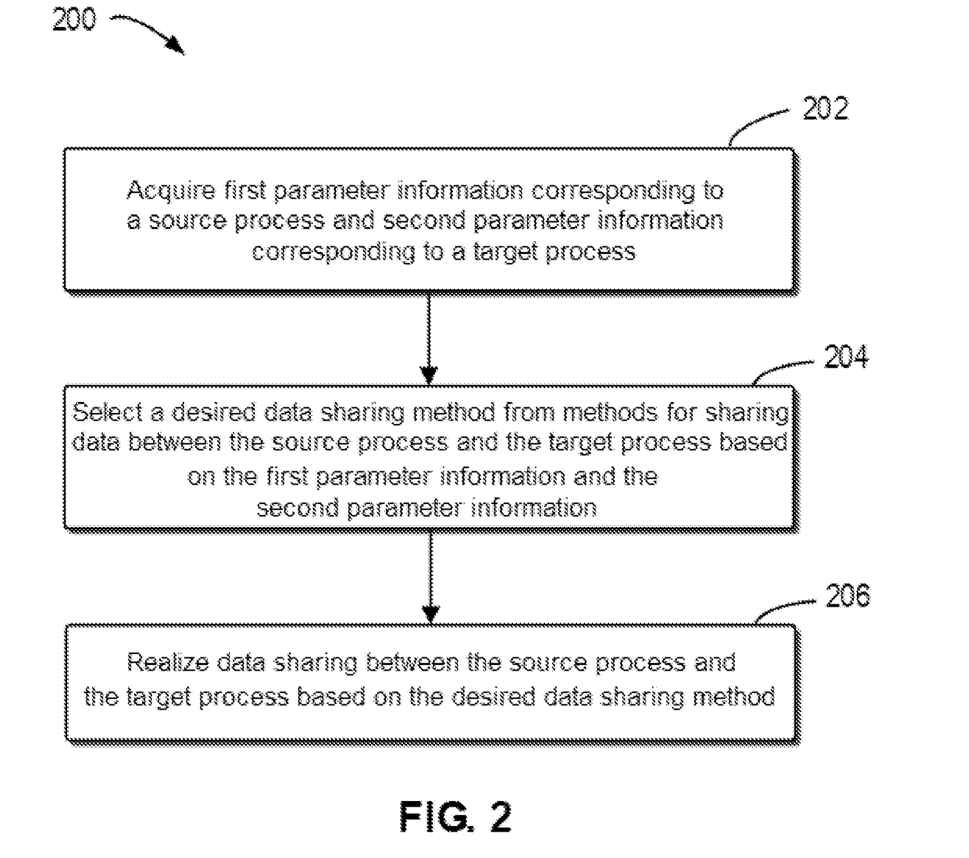
FIG. 2 is a flow chart for data sharing according to some embodiments of the present disclosure.

Referring now to FIG. 2, a flow chart of method 200 for data sharing according to some embodiments of the present disclosure is shown. Method 200 may be applicable to data sharing among processes 101 in computing environment 100.

At block 202, first parameter information corresponding to a source process and second parameter information corresponding to a target process are acquired. For example, the source process may be any of the processes 101 in FIG. 1 that provides data for further processing, e.g., process 101-1. The target process herein may be any process in the processes 101 that shares data with source process 101-1 and further processes the shared data, for example, may be process 101-2 that shares data with source process 101-1.

In some embodiments, the source process and the target process may both be located in the same processing device. In other embodiments, the source process and the target process may be located in different processing devices. For example, source process 101-1 may be located in a first processing device, target process 101-2 may be located in a second processing device, and the first processing device and the second processing device may be the same or different. The source process and the target process may both be located in the same network, or may be located in different networks. For example, source process 101-1 may be located in a first network, target process 101-2 may be located in a second network, and the first network and the second network may be the same or different. It should be understood that when the source process and the target process are located in different networks, the source process and the target process are located in different processing devices.

In some embodiments, parameter information about the source process (which may also be referred to as the first parameter information herein) may include, but is not limited to: a type of the processing device where the source process is located (that is, a type of the first processing device), an address of the processing device where the source process is located (that is, an address of the first processing device), and an address of the network where the source process is located (that is, an address of the first network). Parameter information about the target process (which may also be referred to as the second parameter information herein) may include, but is not limited to: a type of the processing device where the target process is located (that is, a type of the second processing device), an address of the processing device where the target process is located (that is, an address of the second processing device), and an address of the network where the target process is located (that is, an address of the second network).

In some embodiments, the source process and the target process are processes used for performing deep learning. It should be understood that the source process and the target process herein may be any process in an application involving data sharing, which is not limited in the present disclosure.

At block 204, based on the first parameter information and the second parameter information, a desired data sharing method is selected from methods for sharing data between the source process and the target process. For example, in a deep learning process, parameter information about source process 101-1 and parameter information about target process 101-2 may be used for identifying computing environment 100 in which the source process and the target process are located. For identified computing environment 100, there are a number of methods for data sharing between source process 101-1 and target process 101-2. In order to shorten the time of data sharing or realize real-time data sharing, the desired data sharing method for current computing environment 100 can be selected from all possible data sharing methods, such as an optimal data sharing method, and the optimal data sharing method may be a method that can achieve the shortest time required for data sharing between source process 101-1 and target process 101-2.

At block 206, data sharing between the source process and the target process is achieved based on the desired data sharing method. The desired data sharing method herein be any data sharing method desired for the computing resources configured by the application and user requirements. For example, data obtained from source process 101-1 and stored in the processor of the computing device is shared to target process 101-2 in real time by using the optimal data sharing method selected at block 204, for further processing of target process 101-2. The specific implementation process of data sharing between the source process and the target process will be described in detail below in the embodiments described with reference to FIG. 3 to FIG. 5.

Using the above method for data sharing, all possible data sharing scenarios can be identified, and then a desired data sharing method can be automatically selected for the identified scenarios, and the desired data sharing method may be used to efficiently achieve inter-process data sharing. This can, for example, minimize data sharing time between processes, which in turn can increase the processing speed of the entire application. For another example, the above method for data sharing does not depend on an actual physical hardware facility to which it is applied, and can be integrated into any Software as a Service (SaaS) or deep learning framework to automatically adapt to various different data sharing scenarios.

In some embodiments, method 200 may further include determining data information corresponding to the data sharing. The data information may include a shared content, a source address of the shared content, a target address of the shared content, and a size of the shared content. The implementation at block 206 may share the shared content from the source process to the target process according to the source address of the shared content, the target address of the shared content, and the size of the shared content.

Embodiments with respect to block 204 in method 200 of FIG. 2 will be further described below. Such embodiments illustratively include example data sharing scenarios referred to herein as Scenario 1, Scenario 2 and Scenario 3.

In some embodiments, a first judgment result of whether the source process and the target process are located in the same network may be determined based on the address of the first network and the address of the second network, and the desired data sharing method is selected based on the first judgment result. In the scenarios involved in these embodiments, the address of the network where the source process is located may be different from the address of the network where the target process is located. That is, the source process and the target process may be located in different networks. For example, for Scenario 1, selecting a desired data sharing method may include selecting a first data sharing method from all possible data sharing methods as the desired data sharing method, where the first data sharing method is based on remote direct memory access between network interface cards and direct memory access between a network interface card and a memory of a corresponding processing device.

In some embodiments, a second judgment result of whether the source process and the target process are located in the same processing device may be determined based on the address of the first processing device and the address of the second processing device, and the desired data sharing method is selected based on the first judgment result and the second judgment result. In Scenario 2 involved in these embodiments, the address of the network where the source process is located may be the same as the address of the network where the target process is located, and the address of the processing device where the source process is located may be different from the address of the processing device where the target process is located. That is, the source process and the target process may be located in the same network, but may not be located in the same processing device. For example, for Scenario 2, selecting the desired data sharing method may include selecting a second data sharing method from all possible data sharing methods as the desired data sharing method, where the second data sharing method is based on direct memory access between the first processing device and the second processing device.

In some embodiments, a third judgment result of whether the first processing device and the second processing device are of the same type may be determined based on a type of the first processing device and a type of the second processing device, and the desired data sharing method is selected based on the third judgment result. In Scenario 3 involved in these embodiments, the address of the processing device where the source process is located may be the same as the address of the processing device where the target process is located. That is, the source process and the target process may be located in the same processing device. In an example, selecting the desired data sharing method may include: selecting a third data sharing method from all possible data sharing methods as the desired data sharing method, where the third data sharing method is based on a mapping relationship between the source process and the target process.

In addition, in Scenario 1 and Scenario 2, the type of the processing device where the source process is located may be different from the type of the processing device where the target process is located. For example, the first processing device may be a GPU, and the second processing device may be a TPU. For another example, the manufacturer of the first processing device is different from the manufacturer of the second processing device. The type of the processing device where the source process is located may also be the same as the type of the processing device where the target process is located. For example, the first processing device and the second processing device may both be GPUs from the same manufacturer.

For the above different scenarios, embodiments of the present disclosure may determine respective corresponding data sharing methods. Based on the parameter information about the source process and the parameter information about the target process, it is determined which of the above scenarios characterize the source process and the target process, and then, for the determined scenario, a desired data sharing method corresponding to the scenario is determined. Next, specific implementations of the desired data sharing methods corresponding to the above different scenarios will be further described with reference to FIG. 3 to FIG. 5.

Figure 3:
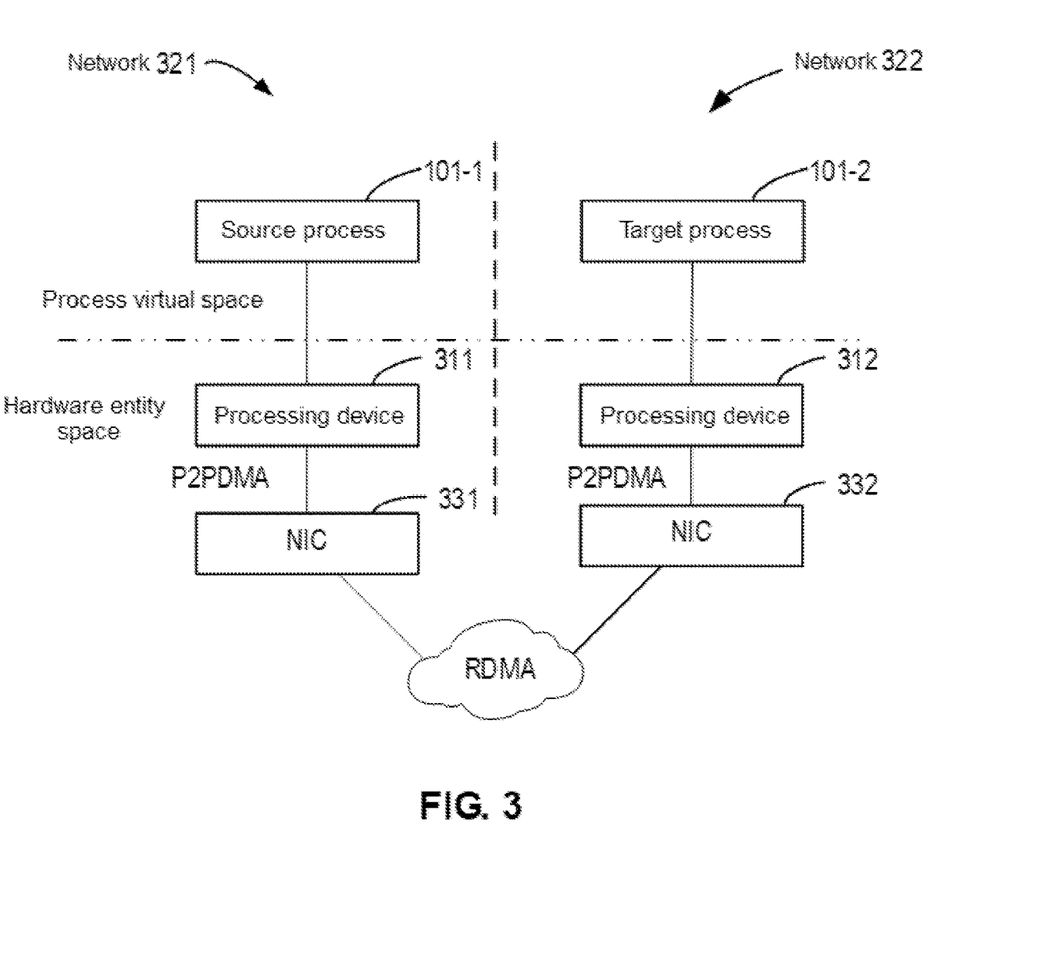
FIG. 3 is an example of data sharing for a first scenario according to some embodiments of the present disclosure.

FIG. 3 is an example of data sharing for Scenario 1 according to some embodiments of the present disclosure.

In Scenario 1, the source process and the target process are not located in the same network, nor are they located in the same processing device. As shown in FIG. 3, source process 101-1 in virtual space is located in processing device 311 in network 321 and hardware entity space (which may also be interpreted as kernel space in this disclosure), and target process 101-2 in the virtual space is located in processing device 312 in network 322 and the hardware entity space, where processing device 311 is different from processing device 312, and network 321 is different from network 322. Processing device 311 and processing device 312 may implement cross-network communication through Network Interface Card (NIC) 331 connected to processing device 311 and NIC 332 connected to processing device 312. Data sharing between source process 101-1 and target process 101-2 may be achieved by the following example.

A virtual memory of source process 101-1 is mapped to a memory of processing device 311, which involves a first mapping of the virtual address of source process 101-1 to a physical address of processing device 311, so as to obtain a first mapping relationship table. A virtual memory of target process 101-2 is mapped to a memory of processing device 312, which involves a second mapping of the virtual address of target process 101-2 to a physical address of processing device 312, so as to obtain a second mapping relationship table. A P2P Direct Memory Access (P2P DMA) is established between processing device 311 and NIC 331 corresponding to processing device 311. A P2P DMA is established between processing device 312 and NIC 332 corresponding to processing device 312. A Remote Direct Memory Access (RDMA) is established between NIC 331 and NIC 332. Data sharing between source process 101-1 and target process 101-2 can be achieved through the first mapping, the P2P DMA between processing device 311 and NIC 331, the RDMA, the P2P DMA between processing device 312 and NIC 332, and the second mapping.

For example, for a deep learning application, before starting data sharing between processes, an initialization process can be performed specifically as follows. A kernel launch option is configured by enabling the P2P DMA (only once when the processing device is added to a node). In a process of loading a driver module for the deep learning application, the kernel may read information such as a PCIe configuration table to obtain a device memory configuration, and may also read other information such as the RDMA NIC for subsequent access to a scheduler for the deep learning application. The device driver can map a device memory into a kernel virtual memory. The scheduler can read a kernel virtual address backed up by the device memory for later use.

For example, in Scenario 1, the scheduler may read previously stored device memory mapping information (which may also be referred to as a mapping table, e.g., the first mapping table). The scheduler may calculate a data virtual address/size from source process 101-1. The scheduler may request virtual memory space of a certain size from the kernel, which provides secure access to the hardware computing device for the deep learning application, and map it to the target device memory. The scheduler may request virtual memory space in source process 101-1 from the kernel and map it into a source RDMA NIC device memory. The scheduler may request virtual memory space in target process 101-2 from the kernel and map it into a target RDMA NIC device memory. The scheduler may initiate a P2P DMA between a virtual memory area backed up by processing device 311 and the NIC device memory in source process 101-1, which will result in a P2P DMA between processing device 311 and NIC 331. The scheduler can initiate RDMA transmission of data. When the data arrives at the target, the kernel may send a notification to the scheduler. The scheduler will initiate a P2P DMA between NIC 332 and processing device 312 when receiving the notification. When the P2P DMA is complete, the data is visible within target process 101-2.

Figure 4:
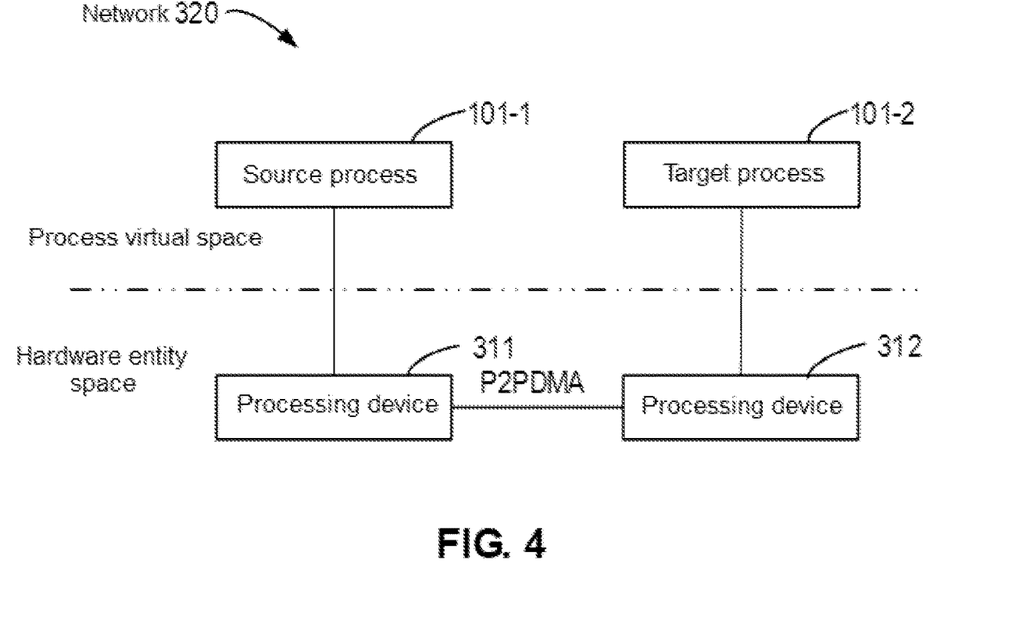
FIG. 4 is an example of data sharing for a second scenario according to some embodiments of the present disclosure.

FIG. 4 is an example of data sharing for Scenario 2 according to some embodiments of the present disclosure.

In Scenario 2, the source process and the target process are located in the same network, but not in the same processing device. As shown in FIG. 4, source process 101-1 and target process 101-2 are located in the same network 320. Source process 101-1 is located in processing device 311, and target process 101-2 is located in processing device 312, where processing device 311 is different from processing device 312. Data sharing between source process 101-1 and target process 101-2 may be achieved by the following example.

A virtual memory of source process 101-1 is mapped to a memory of processing device 311, which involves a first mapping of the virtual address of source process 101-1 to a physical address of processing device 311, so as to obtain a first mapping relationship table. A virtual memory of target process 101-2 is mapped to a memory of processing device 312, which involves a second mapping of the virtual address of target process 101-2 to a physical address of processing device 312, so as to obtain a second mapping relationship table. A P2P DMA is established between processing device 311 and processing device 312. Data sharing between source process 101-1 and target process 101-2 may be implemented through the first mapping, the P2P DMA, and the second mapping.

For example, similar to Scenario 1, an initialization process may also be performed, and the description will not be repeated here. For Scenario 2, the scheduler can read device memory map information that is previously stored. The scheduler may calculate a data virtual address/size from source process 101-1. The scheduler may request virtual memory space of a certain size from the kernel and map it to a target device memory. The scheduler may initiate the P2P DMA between a virtual memory area in source process 101-1 and target process 101-2. The kernel will respond to the P2P DMA request by initiating a P2P DMA between processing device 311 and processing device 312.

Figure 5:
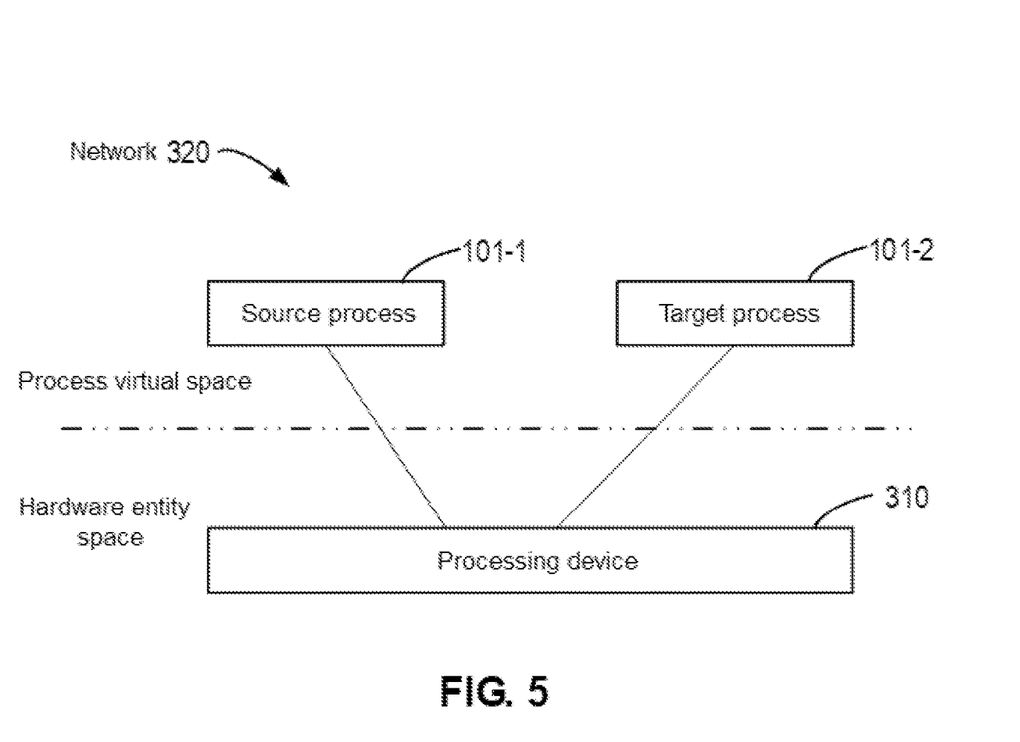
FIG. 5 is an example of data sharing for a third scenario according to some embodiments of the present disclosure.

FIG. 5 is an example of data sharing for Scenario 3 according to some embodiments of the present disclosure.

In Scenario 3, the source process and the target process are located in the same processing device. As shown in FIG. 5, source process 101-1 and target process 101-2 are located in the same processing device 310. Data sharing between source process 101-1 and target process 101-2 may be achieved by the following example.

A virtual memory of source process 101-1 is mapped to a memory of processing device 310, which involves a first mapping of the virtual address of source process 101-1 to a physical address of processing device 310, so as to obtain a first mapping relationship table. A virtual memory of target process 101-2 is mapped to the memory of the same processing device 310, which involves a second mapping of the virtual address of target process 101-2 to the physical address of the same processing device 310 to obtain a second mapping table. Data sharing between source process 101-1 and target process 101-2 may be implemented through the first mapping and the second mapping.

For example, similar to Scenario 1, an initialization process may also be performed, and the description will not be repeated here. For Scenario 3, the scheduler can read the device memory map information that is previously stored. The scheduler may calculate a data virtual address/size from source process 101-1. The scheduler can map the device memory corresponding to the data virtual address into target process 101-2.

In the above embodiment, through the first mapping relationship table and the second mapping relationship table, the process can access the data in the device memory in real time, and the addressing process between the process and the processing device can be reduced or even eliminated, so as to improve the data sharing speed. In addition, the use of the P2P DMA and the RDMA can be more conducive to real-time sharing of data.

Figure 6:
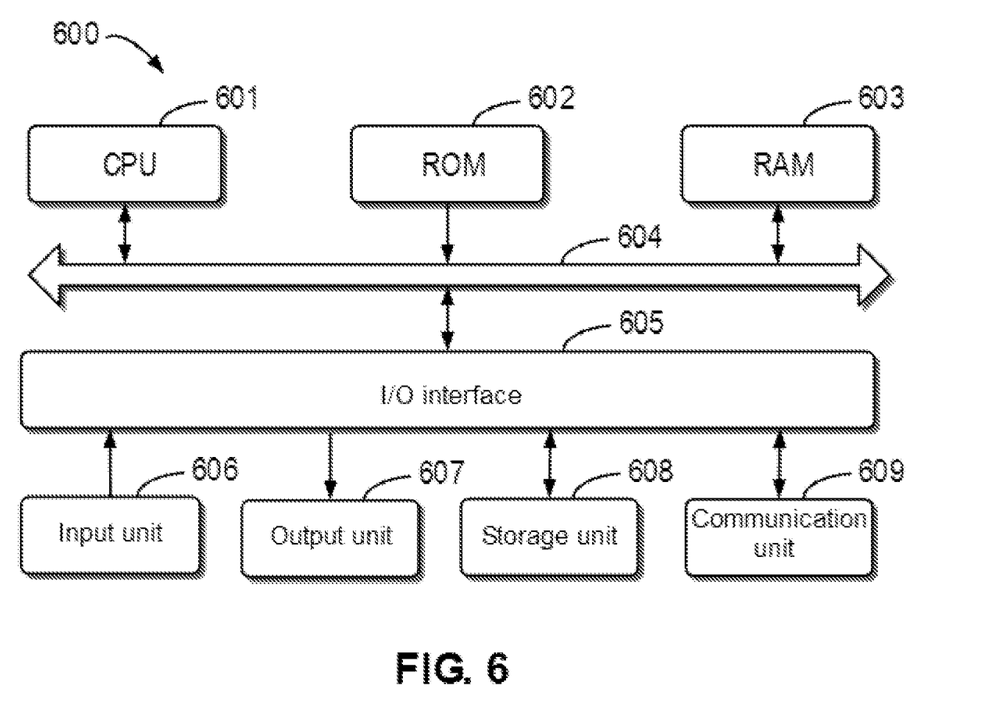
FIG. 6 is a block diagram of an example device that can be used for implementing embodiments of the present disclosure.

FIG. 6 is a schematic block diagram of example device 600 that can be used for implementing embodiments of the present disclosure. Device 600 may be used for implementing method 200 of FIG. 2.

As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200, may be performed by CPU 601. For example, in some embodiments, method 200 may be implemented as a computer software program that is tangibly included in a machine-readable medium such as storage unit 608. In some embodiments, part of or all the computer program may be loaded and/or installed onto device 600 via ROM 602 and/or communication unit 609. One or more actions of method 200 described above may be performed when the computer program is loaded into RAM 603 and executed by CPU 601.

Example embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Example embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for data sharing, comprising:
   acquiring first parameter information corresponding to a source process and second parameter information corresponding to a target process;
   selecting a desired data sharing method from methods for sharing data between the source process and the target process based on the first parameter information and the second parameter information; and
   realizing data sharing between the source process and the target process based on the desired data sharing method;
   wherein acquiring first parameter information corresponding to the source process and second parameter information corresponding to the target process comprises determining one or more portions of each of the first parameter information and the second parameter information as at least one of a corresponding network, a corresponding processing device and a corresponding processing device type for respective ones of the source process and the target process; and wherein the desired data sharing method is selected at least in part as a function of commonality detected between at least portions of the first parameter information and the second parameter information.

2. The method according to claim 1, wherein the source process is located in a first network, the target process is located in a second network, the first parameter information comprises an address of the first network, and the second parameter information comprises an address of the second network; and wherein selecting the desired data sharing method from the methods for sharing data between the source process and the target process comprises:

determining, based on the address of the first network and the address of the second network, a first judgment result of whether the source process and the target process are located in the same network; and selecting the desired data sharing method based on the first judgment result.

3. The method according to claim 2, wherein the source process is located in a first processing device, the target process is located in a second processing device, the first parameter information further comprises an address of the first processing device, and the second parameter information further comprises an address of the second processing device;

selecting the desired data sharing method from the methods for sharing data between the source process and the target process further comprises:

determining, based on the address of the first processing device and the address of the second processing device, a second judgment result of whether the source process and the target process are located in the same processing device; and selecting the desired data sharing method based on the first judgment result and the second judgment result.

4. The method according to claim 3, wherein the first parameter information further comprises a type of the first processing device, and the second parameter information further comprises a type of the second processing device; and wherein selecting the desired data sharing method from the methods for sharing data between the source process and the target process further comprises:

determining, based on the type of the first processing device and the type of the second processing device, a third judgment result of whether the first processing device and the second processing device are of the same type; and selecting the desired data sharing method based on the third judgment result.

5. The method according to claim 2, wherein selecting the desired data sharing method based on the first judgment result comprises:

selecting a first data sharing method among the data sharing methods as the desired data sharing method in a case that the first judgment result is negative, the first data sharing method being based on remote direct memory access between network interface cards and direct memory access between a network interface card and a memory of a corresponding one of first and second processing devices.

6. The method according to claim 3, wherein selecting the desired data sharing method based on the first judgment result and the second judgment result comprises:

selecting a second data sharing method among the data sharing methods as the desired data sharing method in a case that the first judgment result is affirmative and the second judgment result is negative, the second data sharing method being based on direct memory access between the first processing device and the second processing device.

7. The method according to claim 4, wherein selecting the desired data sharing method based on the third judgment result comprises:

selecting a third data sharing method among the data sharing methods as the desired data sharing method in a case that the third judgment result is affirmative, the third data sharing method being based on a mapping relationship between the source process and the target process.

8. The method according to claim 1, wherein the source process and the target process comprise deep learning processes.

9. The method according to claim 1, wherein the method further comprises:

determining data information corresponding to the data sharing, wherein the data information comprises a shared content, a source address of the shared content, a target address of the shared content, and a size of the shared content, and wherein realizing the data sharing between the source process and the target process comprises:

sharing the shared content from the source process to the target process according to the source address of the shared content, the target address of the shared content, and the size of the shared content.

10. An electronic device, comprising:

at least one processor; and at least one memory storing computer-executable instructions, the at least one memory and the computer-executable instructions being configured to cause, together with the at least one processor, the electronic device to perform actions comprising:

acquiring first parameter information corresponding to a source process and second parameter information corresponding to a target process;

selecting a desired data sharing method from methods for sharing data between the source process and the target process based on the first parameter information and the second parameter information; and realizing data sharing between the source process and the target process based on the desired data sharing method;

wherein acquiring first parameter information corresponding to the source process and second parameter information corresponding to the target process comprises determining one or more portions of each of the first parameter information and the second parameter information as at least one of a corresponding network, a corresponding processing device and a corresponding processing device type for respective ones of the source process and the target process; and wherein the desired data sharing method is selected at least in part as a function of commonality detected between at least portions of the first parameter information and the second parameter information.

11. The electronic device according to claim 10, wherein the source process is located in a first network, the target process is located in a second network, the first parameter information comprises an address of the first network, and the second parameter information comprises an address of the second network; and
   wherein selecting the desired data sharing method from the methods for sharing data between the source process and the target process comprises:
   determining, based on the address of the first network and the address of the second network, a first judgment result of whether the source process and the target process are located in the same network; and
   selecting the desired data sharing method based on the first judgment result.

12. The electronic device according to claim 11, wherein the source process is located in a first processing device, the target process is located in a second processing device, the first parameter information further comprises an address of the first processing device, and the second parameter information further comprises an address of the second processing device;
   selecting the desired data sharing method from the methods for sharing data between the source process and the target process further comprises:
   determining, based on the address of the first processing device and the address of the second processing device, a second judgment result of whether the source process and the target process are located in the same processing device; and
   selecting the desired data sharing method based on the first judgment result and the second judgment result.

13. The electronic device according to claim 12, wherein the first parameter information further comprises a type of the first processing device, and the second parameter information further comprises a type of the second processing device; and
   wherein selecting the desired data sharing method from the methods for sharing data between the source process and the target process further comprises:
   determining, based on the type of the first processing device and the type of the second processing device, a third judgment result of whether the first processing device and the second processing device are of the same type; and
   selecting the desired data sharing method based on the third judgment result.

14. The electronic device according to claim 11, wherein selecting the desired data sharing method based on the first judgment result comprises:
   selecting a first data sharing method among the data sharing methods as the desired data sharing method in a case that the first judgment result is negative, the first data sharing method being based on remote direct memory access between network interface cards and direct memory access between a network interface card and a memory of a corresponding one of first and second processing devices.

15. The electronic device according to claim 12, wherein selecting the desired data sharing method based on the first judgment result and the second judgment result comprises:
   selecting a second data sharing method among the data sharing methods as the desired data sharing method in a case that the first judgment result is affirmative and the second judgment result is negative, the second data sharing method being based on direct memory access between the first processing device and the second processing device.

16. The electronic device according to claim 13, wherein selecting the desired data sharing method based on the third judgment result comprises:
   selecting a third data sharing method among the data sharing methods as the desired data sharing method in a case that the third judgment result is affirmative, the third data sharing method being based on a mapping relationship between the source process and the target process.

17. The electronic device according to claim 10, wherein the source process and the target process comprise deep learning processes.

18. The electronic device according to claim 10, wherein the actions further comprise:
   determining data information corresponding to the data sharing, wherein the data information comprises a shared content, a source address of the shared content, a target address of the shared content, and a size of the shared content, and
   wherein realizing the data sharing between the source process and the target process comprises:
   sharing the shared content from the source process to the target process according to the source address of the shared content, the target address of the shared content, and the size of the shared content.

19. A computer program product that is tangibly stored on a non-transitory computer-readable medium and comprises computer-executable instructions, wherein the computer-executable instructions, when executed by a device, cause the device to perform:
   acquiring first parameter information corresponding to a source process and second parameter information corresponding to a target process;
   selecting a desired data sharing method from methods for sharing data between the source process and the target process based on the first parameter information and the second parameter information; and
   realizing data sharing between the source process and the target process based on the desired data sharing method;
   wherein acquiring first parameter information corresponding to the source process and second parameter information corresponding to the target process comprises determining one or more portions of each of the first parameter information and the second parameter information as at least one of a corresponding network, a corresponding processing device and a corresponding processing device type for respective ones of the source process and the target process; and
   wherein the desired data sharing method is selected at least in part as a function of commonality detected between at least portions of the first parameter information and the second parameter information.

20. The computer program product according to claim 19, wherein the source process is located in a first network, the target process is located in a second network, the first parameter information comprises an address of the first network, and the second parameter information comprises an address of the second network; and
   wherein selecting the desired data sharing method from the methods for sharing data between the source process and the target process comprises:
   determining, based on the address of the first network and the address of the second network, a first judgment result of whether the source process and the target process are located in the same network; and selecting the desired data sharing method based on the first judgment result.

\* \* \* \* \*